Oct. 12, 1948.　　　　J. C. CROWLEY　　　　2,451,276
VALVE INSIDES
Filed April 27, 1944

INVENTOR.
JOHN C. CROWLEY
BY
Kwis Hudson Boughton & Williams
ATTORNEYS

Patented Oct. 12, 1948

2,451,276

UNITED STATES PATENT OFFICE 2,451,276

VALVE INSIDES

John C. Crowley, Cleveland Heights, Ohio, assignor to The Dill Manufacturing Company, Cleveland, Ohio, a corporation of Ohio Application April 27, 1944, Serial No. 532,963

4 Claims. (Cl. 251—27).

This invention relates to a valve insides or valve core such as is used in the valve stems of inflatable articles of various types, the most common of which are pneumatic tires for motor vehicles, airplane landing struts and the like.

Heretofore valve insides or valve cores designed for installation in the valve stems of articles inflated at low pressure, such as the modern pneumatic tires of motor vehicles, have not been well suited or have not functioned satisfactorily when used in the valve stems of articles where the insides or cores are subject to high pressures, such as is the case in airplane landing struts, hydraulic accumulators and other high pressure installations. Similarly, valve insides or valve cores designed for use in high pressure installations have not been suitable or completely satisfactory when used in low pressure installations. In other words, there has not been prior to the present invention a valve core or valve insides that can be interchangeably used with equal effectiveness and efficiency in either high or low pressure installations.

An object of the invention is to provide a valve core or valve insides which is universal in its capability of being used effectively, efficiently and satisfactorily in either high pressure or low pressure installations.

One of the principal reasons that a valve core or valve insides designed primarily for low pressure installation is not completely satisfactory when used in a high pressure installation or vice versa is that the rubber valve member suitable for low pressure installation is not suitable for high pressure installation and the rubber valve member suitable for high pressure installation is not suitable for low pressure installation.

More specifically the rubber valve member of a valve insides or valve core which is to be used in low pressure installations should be formed of relatively soft flexible rubber to provide the desired and necessary flexibility to obtain the requisite sealing effect at low pressures. Such relatively soft rubber valve member is not suitable for use at high pressure, since the member is pressed so firmly against its seat as to be damaged and distorted. A rubber valve member of a valve insides or valve core which is sufficiently hard to be suitable for high pressure installations is not suitable in low pressure installations as said member does not contain sufficient flexibility or resilience to furnish the requisite seal at low pressures.

Another object of the invention is to provide an improved and novel valve core or valve insides wherein the rubber valve member is formed of sufficiently hard material to function satisfactorily at high pressures yet is so designed as to have the requisite flexibility to provide the proper effective seal at low pressures.

The usual valve core or valve insides heretofore known has the disadvantage that the valve seat of the barrel is formed by a relatively narrow sharp edge against which seats the rubber valve member of the insides or core, with the result that said narrow sharp edge cuts or embeds itself into the rubber valve member, particularly in high pressure installations, even though said member may be formed of relatively hard material.

An object of the present invention is to provide a valve core or valve insides which is so constructed that the valve seat will have minimum damaging effect upon the rubber valve member when the latter is seated thereagainst, either in high pressure installations or in low pressure installations.

Another object of the invention is to provide a valve insides or valve core wherein the valve seat and the rubber valve member are so constructed that when the insides or core is used in high pressure installations there will be a positive large area surface contact between the rubber valve member and the valve seat while in low pressure installations there will be a line contact between the seat and the rubber valve member so effected as not to damage the latter.

Another object is to provide a valve insides or valve core wherein the barrel, the rubber valve member, and the element which carries the latter are so designed that when the valve core or insides is subjected to extremely high pressures cold flowing or extrusion of the rubber material of the valve member will be precluded.

Another and more specific object of the invention is to provide a valve insides or valve core wherein the guiding ball or enlargement on the valve pin is substantially in contact with the rubber valve member and the bore in the barrel so as to prevent cold flowing of the material of said member into the barrel of the valve insides or core when the latter is subjected to extremely high pressures.

Another specific object of the invention is to provide a valve insides or valve core wherein there is no possibility of leakage occurring between the valve pin and the element mounted thereon and which contains the rubber valve member, a feature which is particularly advantageous and important when the valve core or insides is subjected to high pressures.

Further and additional objects and advantages not hereinbefore specified will become apparent during the detailed description of an embodiment of the invention which is to follow. Referring to the accompanying drawing illustrating said embodiment of the invention, Fig. 1 is a sectional view through the improved valve core or valve insides and shows the manner in which the valve member engages the valve seat when the core or insides is used in low pressure installations.

Figure 1:
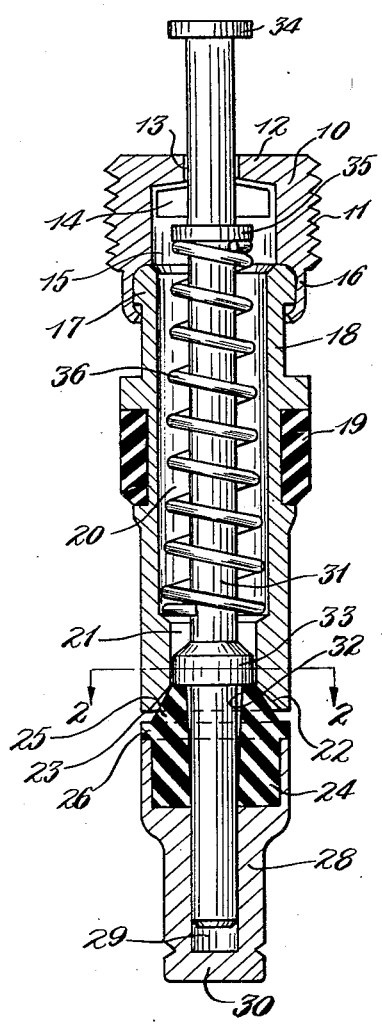

The improved valve insides or core is illustrated as provided with the usual bridge or plug member 10. This plug member may be of generally circular or cylindrical configuration and provided with screw threads 11. The plug member 10 may have cutaway chord-like portions adjacent its outer end to provide a relatively narrow diametrically extending bridge 12 which can be engaged and rotated by a suitable tool when the valve insides or core is being inserted into or removed from a valve stem. The bridge 12 is provided with a centrally disposed opening 13. The plug member at each flat side of the bridge is provided with a lateral opening 14 communicating with the interior 15 of the plug. The lower end of the plug 10 is provided with a flange 16 which extends across an external annular rib 17 formed on the adjacent end of the barrel 18 of the core or insides. The flange 16 at its free end is turned inwardly beneath the rib 17, wherefore the plug 10 is swivelly connected to the adjacent end of the barrel 18 of the core or insides. The construction of the plug member 10 as herein set forth is conventional and is well understood in the art. It will be appreciated, however, that different forms of plug members well known in the art might be employed in place of the plug member 10, since the construction of said plug member and the manner in which it is connected to the barrel 18 forms per se no part of the present invention.

The barrel 18 of the core or insides is provided externally with an annular recess receiving and carrying a ring gasket 19 as is common in valve insides or cores. The barrel 18 is provided internally with an enlarged bore 20 that communicates with a reduced bore 21. The reduced bore 21 at its outer end communicates with a conical recess in the end of the barrel 18 and which recess is provided by the conical wall 22 which is inwardly convergent relative to the barrel 18. The end of the barrel 18 that is remote from the plug 10 is formed with a substantially flat surface 23. The portions of the conical wall 22 adjacent to the reduced bore 21 of the barrel form the valve seat for the valve member when the core or insides is used in low pressure installations, while said conical wall 22 and the flat end surface 23 form the valve seat for the valve member when the core or insides is used in high pressure installations.

The valve member 24 which cooperates with the valve seat of the barrel is preferably formed of rubber-like material and has a main cylindrical portion and a conical portion 25 separated from the main portion by an external annular rib 26. The valve member 24 is provided with an axial opening 27 extending therethrough and increasing slightly in diameter from the end of the opening which is at the outer end of the main portion of the valve member toward the end of the opening that is at the small end of the conical portion 25 of the valve member. The purpose of the opening 27 being thus tapered is an important feature in the construction of the valve core and will be explained more fully hereinafter.

Figure 3:
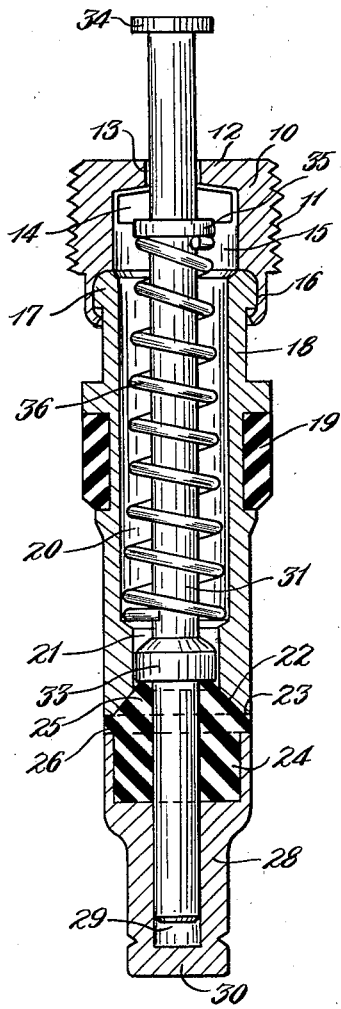
Fig. 3 is a sectional view similar to Fig. 1 but shows the manner in which the valve member engages the valve seat when the core or insides is used in high pressure installations.
Figure 2:
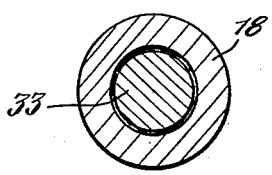
Fig. 2 is a sectional view taken on line 2—2 of Fig. 1 looking in the direction of the arrows.
Figure 4:
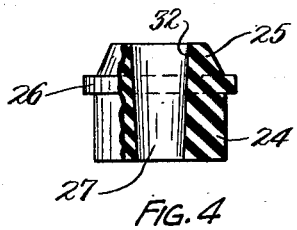
Fig. 4 is a detached view, partly in elevation and partly in section, of the rubber valve member of the insides or core.

The valve member 24 is mounted and secured in the counterbore of a cup element 28, with the annular rib 26 of the valve member overlying and contacting the adjacent end of the cup element as clearly shown in Figs. 1 and 3. The small end of the opening 27 through the valve member 24 registers with a bore 29 formed in the cup element 28 and said small end of the opening 27 is substantially of the same diameter as the diameter of said bore 29. The bore 29 does not extend completely through the cup element 28 since the end of said element is closed as indicated at 30 for a purpose which is important and which will later be explained.

The valve pin 31 extends through the opening 27 in the valve member and into the bore 29 of the cup element 28 and said element and said valve pin are rigidly secured together by means well known in the art. It will be noted that the valve pin 31 is of such diameter that it has a close fit with the bore 29 of the cup element and with the small end of the opening 27 of the valve member 24. It will further be noted, however, that except at the small end of the opening there is clearance between the valve pin 31 and the wall of the opening 27 of the valve member, and that said clearance increases toward the conical portion of the member and the large end of the opening 27 as indicated at 32 in Fig. 1. This clearance 32 is provided, of course, by having the opening 27 in the valve member 24 increasing in diameter toward the conical portion 25 and the purpose of providing this clearance will be fully pointed out hereinafter.

The valve pin 31 is provided with an enlarged cylindrical guiding portion 33 which has guiding movement in the smaller bore 21 of the barrel 18 and which is so located as to contact the end of the conical portion 25 of the valve member for a purpose which will later be explained. It should be noted, however, that the outside diameter of the small end of the conical portion 25 of the valve member which is contacted by the cylindrical guide portion 33 of the pin normally is somewhat greater than the diameter of said portion 33.

The valve pin extends through the barrel 18 and the plug 10, it being noted that said pin passes through the opening 13 in the bridge 12 and can have reciprocating movement in said opening. The outer end of the valve pin is provided with a head 34 while inwardly of the plug 10 the pin is provided with an abutment collar 35 against which engages one end of the valve spring 36, while the opposite end of said valve spring engages the shoulder formed internally of the barrel 18 at the junction of the larger bore 20 with the smaller bore 21.

It will be understood that the valve spring 36 is for the purpose of maintaining the valve member 24 in engagement with the valve seat as is common in valve insides or valve cores. The spring 36 preferably is of such strength as to engage the valve member with its seat for low pressure installations.

It will also be understood that the valve core is inserted into the valve stem in which it is to be used by positioning said core or insides in the stem, engaging the threads 11 of the plug 10 with the internal threads of the valve stem, and then rotating said plug by the bridge 11 to screw the valve core or insides into the stem until the ring gasket 19 of the barrel is in tight sealing engagement with the smooth internal bore portion of the valve stem, as is well known in the art. The valve core or valve insides can be removed from the stem in the usual way by first unscrewing the plug 10, as will be well understood.

As already explained, the main object of the present invention is to provide a valve core which is universal in use in the sense that the valve core can be employed with equal effectiveness, efficiency and satisfaction for either high pressure or low pressure installations. This is accomplished by forming the valve member 24 of relatively hard rubber-like material but at the same time providing the desired flexibility in the material to enable the valve member to function properly for low pressure installations. This flexibility is brought about by the provision of the clearance 32 between the conical portion 25 of the valve member and the circumference of the valve pin.

Referring to Fig. 1, which discloses the manner in which the valve member cooperates with the valve seat when the core or insides is employed in a low pressure installation, it will be seen that the end of the conical portion 25 of the valve member contacts the conical surface 22 at the end of the barrel 18 near that part of said surface of minor diameter and that said contact is a line contact. The clearance 32 between the valve pin and the valve member allows the conical portion 25 of said member to flex and, therefore, the requisite flexibility is provided in the valve member for low pressure installations.

Fig. 3 discloses the relationship of the parts when the valve core or insides is employed in high pressure installations. The high pressures to which the core or insides would then be subjected forces the conical portion 25 of the valve member into complete engagement with the conical surface 22 and also causes the flange or rib 26 of the valve member to engage the flat surface 23 at the end of the barrel. Therefore in high pressure installations the valve member contacts a seat of large surface area and formed by the conical surface 22 and the flat surface 23 and there is a positive sealing engagement between the valve member and the barrel 18. It will be noted that when this positive sealing engagement takes place the conical portion 25 of the valve member is flexed inwardly until the clearance 32 disappears and the conical portion of the valve member engages the pin 31 throughout the length of the opening 27. The positive large surface area contact between the valve member and the barrel 18 precludes the cold flowing or extrusion of the material of the valve member when the core or insides is subjected to high pressures. Also, since the cylindrical guiding portion 33 of the valve pin contacts the small end of the conical portion 25 of the valve member and said portion 33 has a guiding fit in the bore 21 of the barrel, there is little chance for the material of the valve member to cold flow in the bore 21 under high pressures.

It will be noted that in both low pressure installation and high pressure installation the valve member 24 is not in contact with a sharp edged valve seat which would act to injure the valve member and particularly at high pressures.

It was previously explained that the end 30 of the cup element 28 was closed, wherefore the bore 29 in said element is completely sealed against air or other fluid getting therein and leaking upwardly between the wall of the bore and the valve pin and between the valve member and the valve pin.

From the foregoing description it will be clearly apparent that a novel and improved valve insides or valve core is the result of the inventive concept explained herein with reference to one embodiment thereof and that said improved insides or core may be interchangeably used for either low pressure or high pressure installations and will prove equally as effective and efficient in both such uses.

Although a preferred embodiment of the invention has been illustrated and described herein it will be understood that the invention is susceptible of various modifications and adaptations within the scope of the appended claims.

Having thus described my invention, I claim:

1. A valve insides or core comprising a barrel having at one end a conical valve seat, a valve pin movable through said barrel, and a valve member formed of rubber-like material mounted on said pin and having at one end a conical portion adapted to engage said seat, said valve member having a central opening therein extending from the small end of said conical portion inwardly of the member and which opening increases in diameter from its inner end toward the small end of said conical portion with its minimum diameter substantially equal to the external diameter of said pin, said pin extending into said opening with clearance normally existing between it and said conical portion of said member thus increasing the flexibility of said portion, said portion having a degree of taper so related to the degree of taper of the valve seat that it has a small area contact with said seat in low pressure installations of said insides or core and a large surface area contact with said seat in high pressure installations of said insides or core, at which latter time said conical portion of the valve member is flexed into contact with said valve pin substantially throughout the length of said opening.

2. A valve insides or core comprising a barrel having at one end a conical valve seat, a valve pin movable through said barrel, and a valve member formed of rubber-like material mounted on said pin and having at one of its ends a conical portion adapted to engage said seat and an external annular rib adjacent said conical portion, said member having a central opening extending from the small end of said conical portion inwardly of the member and into which said pin extends, the diameter of said opening increasing from inwardly of the member toward the small end of said conical portion and providing normally clearance between said conical portion and said pin and thus increasing the flexibility of said portion, said portion having a degree of taper so related to the degree of taper of the valve seat that it engages said seat with a line contact in low pressure installations of said insides or core while said portion and said rib engage said seat and the end of said barrel with a large area surface contact during high pressure installation of said insides or core and at which latter time said conical portion is flexed into engagement with said valve pin substantially throughout the length of said opening.

3. A valve insides or core comprising a barrel having at one end a conical valve seat and provided with a bore therethrough, a valve pin movable through said bore and provided with an enlargement guided by a portion of said bore inwardly of but adjacent to said valve seat, and a valve member formed of rubber-like material mounted on said pin and having at one of its ends a conical portion adapted to engage said seat and which conical portion contacts at its small end said enlargement on said pin, said member having a central opening in which said pin is located and extending from the small end of said conical portion inwardly of said member, said opening having its diameter increasing from inwardly of said member toward the small end of said conical portion to provide normally clearance between the latter and said pin and increase the flexibility of said conical portion, the degree of taper of said conical portion being so related to the degree of taper of said valve seat that the small end of said portion engages said seat adjacent the minimum diameter of the latter with a line contact in low pressure installation of the valve insides or core while said conical portion engages said valve seat with a large area surface contact in high pressure installation of the insides or core and at which latter time said conical portion is flexed into contact with said valve pin substantially throughout the length of said opening.

4. A valve insides or core as defined in claim 3 and wherein said member is provided with an external annular rib adjacent the large end of said conical portion and which rib contacts the end of said barrel in high pressure installations of the insides or core.

JOHN C. CROWLEY.

REFERENCES CITED

The following references are of record in the file of this patent:

UNITED STATES PATENTS

| Number | Name | Date |
|---|---|---|
| 405,404 | Forestier | June 18, 1889 |
| 1,372,878 | Harder | Mar. 29, 1921 |
| 1,426,350 | Bronson | Aug. 22, 1922 |
| 1,429,047 | Payne | Sept. 12, 1922 |
| 1,438,081 | Allen | Dec. 5, 1922 |
| 1,733,180 | Biedermann | Oct. 29, 1929 |
| 2,075,167 | Broecker | Mar. 30, 1937 |
| 2,285,343 | Marchand | June 2, 1942 |

FOREIGN PATENTS

| Number | Country | Date |
|---|---|---|
| 9,164 | Great Britain | June 22, 1915 |